United States Patent [19]

Moses

[11] Patent Number: 5,237,582
[45] Date of Patent: Aug. 17, 1993

[54] CONDUCTIVE POLYMER DYE LASER AND DIODE AND METHOD OF USE

[75] Inventor: Daniel Moses, Santa Barbara, Calif.

[73] Assignee: The Regents of the University of California, Oakland, Calif.

[21] Appl. No.: 904,731

[22] Filed: Jun. 26, 1992

[51] Int. Cl.$^5$ .............................................. H01S 3/20
[52] U.S. Cl. ........................................ 372/53; 372/54; 252/301.17
[58] Field of Search ................ 372/53, 54; 252/301.17

[56] References Cited

U.S. PATENT DOCUMENTS 4,896,329 1/1990 Knaak ................................ 372/53

OTHER PUBLICATIONS

Sorokin, P. P. et al., "Laser-pumped Stimulated Emission from Organic Dyes: Experimental Studies and Analytical Comparisons", IBM Journal 130–148(Mar. 1967).

Primary Examiner—Leon Scott, Jr.
Attorney, Agent, or Firm—Viviana Amzel

[57] ABSTRACT

A novel dye laser comprises a laser dye solution comprising a conductive polymer having the chemical formula

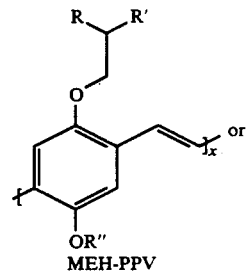

MEH-PPV

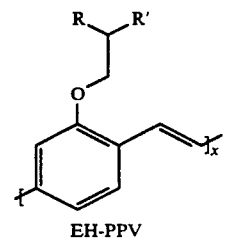

EH-PPV wherein R comprises $(C_1-C_{10})$alkyl, R' is the same or different from R and comprises alkyl, substituted alkyl, benzyl, or substituted benzyl, such as $-(CH_2)_nCH_3$ or $CH_2C_6H_4(CH_2)_nY$, wherein Y is O-alkyl, alkyl, alkenyl or alkynyl and n is greater than 1 and up to 200, and for structure IV R" is the same or different from R and comprises $(C_1-C_{10})$alkyl, and x is greater than about 20, and a non-aqueous solvent; the solvent being substantially unable to chemically react with the polymer and to absorb and emit light at a wavelength similar to the conductive polymer, and a pumping energy source operably coupled therewith and capable of producing stimulated emmission of the dye solution.

A laser device, comprising a solid body of the conductive polymer described above, and a host polymer, the host polymer being unable to chemically react with the polymer and unable to absorb and emit light at a wavelength similar to the conductive polymer, means for pumping the body to generate light therein, and means for creating distributed feedback of the light to achieve a substantially coherent beam of light which is emitted from the body.

26 Claims, 4 Drawing Sheets

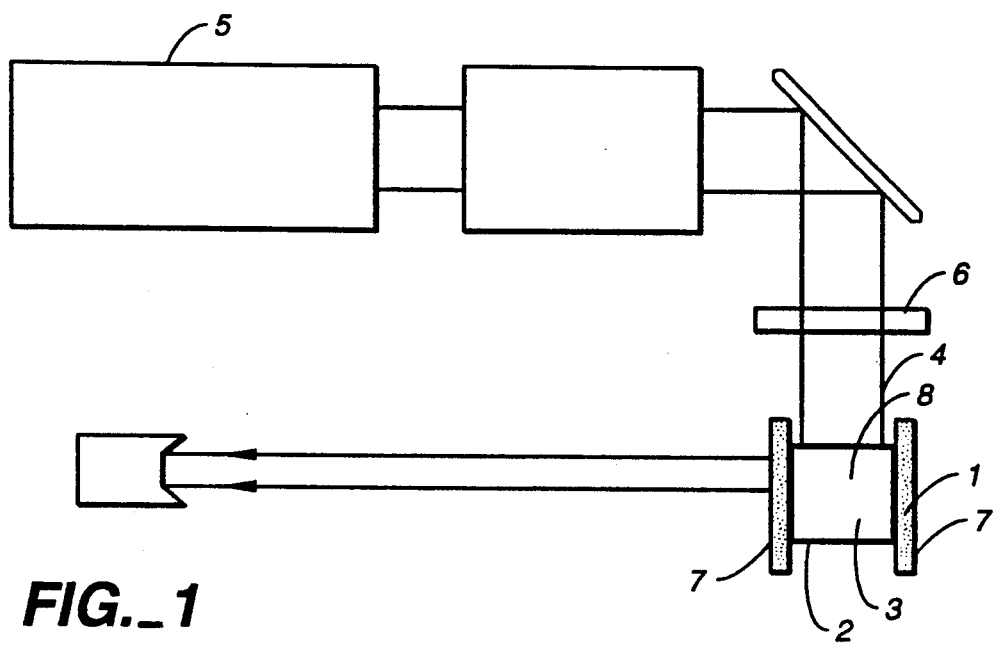
FIG._1
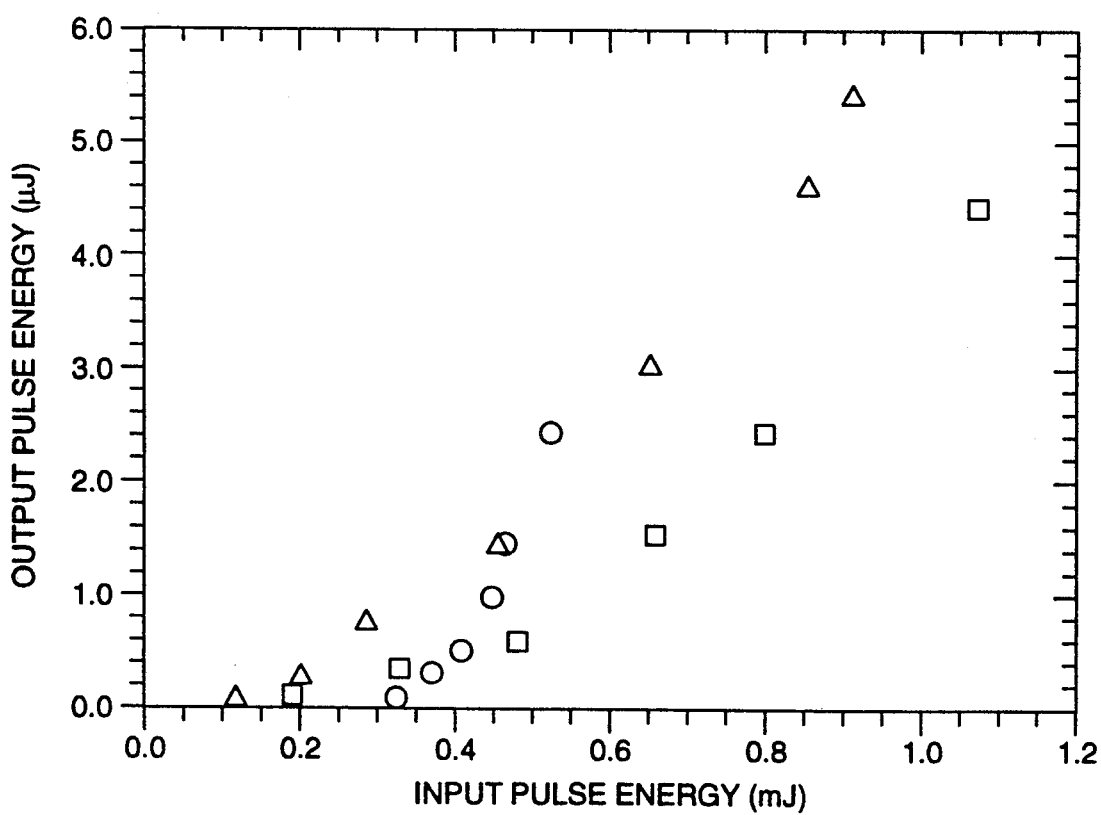
FIG._2

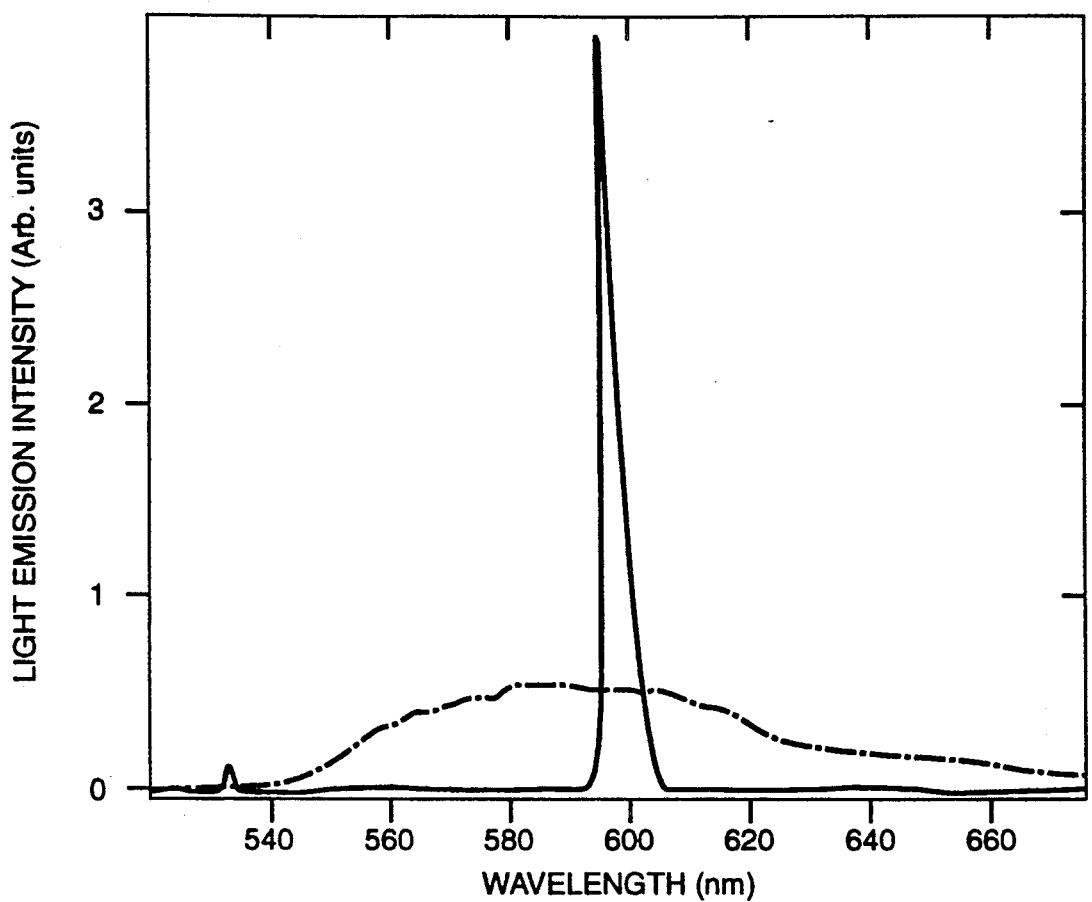
FIG._3
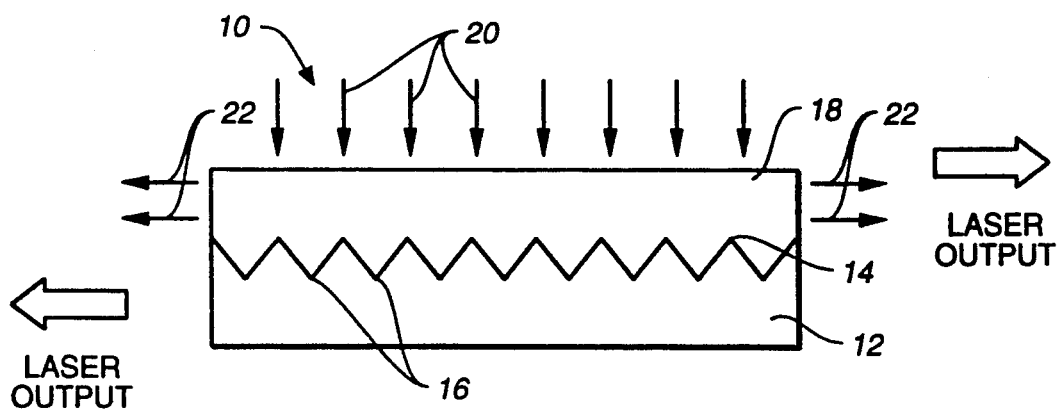
FIG._4

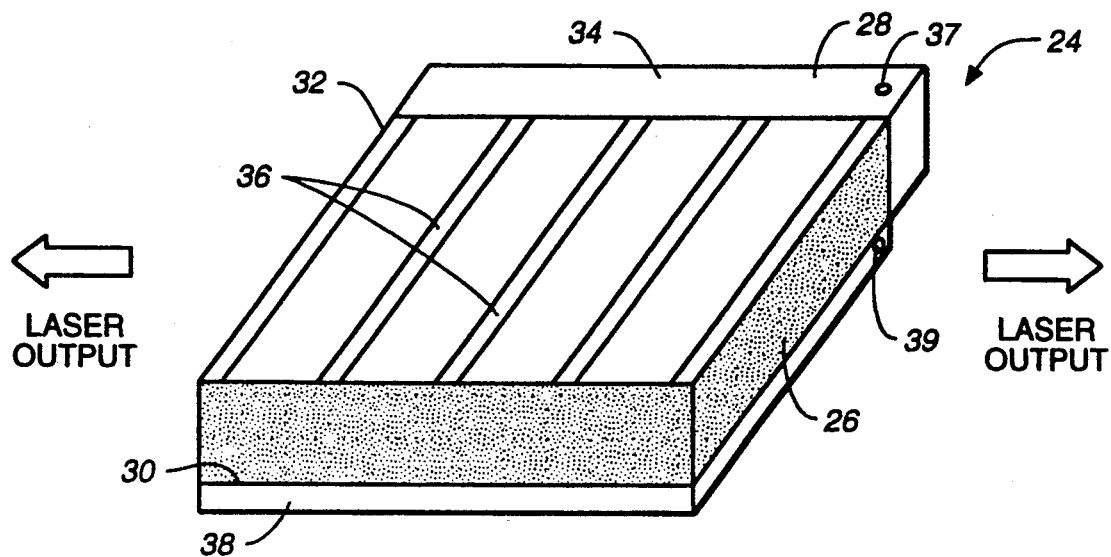
FIG._5
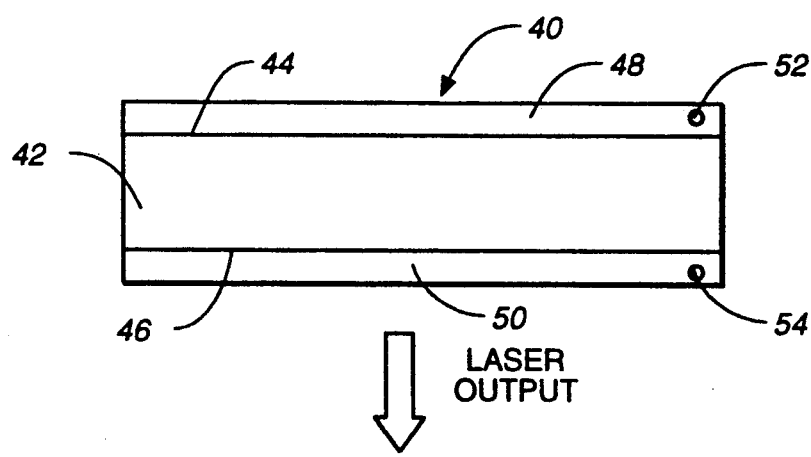
FIG._6

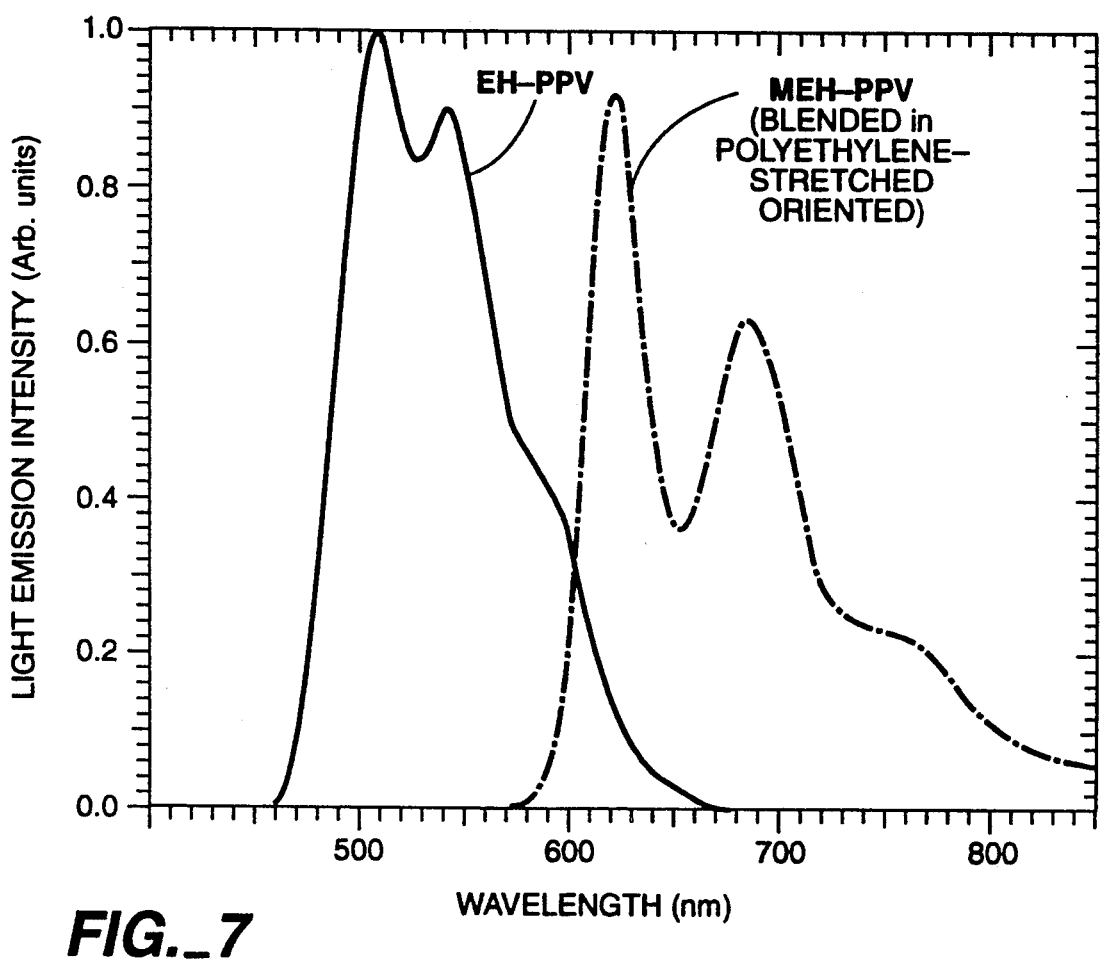
FIG._7

CONDUCTIVE POLYMER DYE LASER AND DIODE AND METHOD OF USE

The work leading to this invention was at least partially supported by National Science Foundation Grant No. DMR 89-15207. The Government may have rights in this invention.

BACKGROUND OF THE INVENTION

1. Field of the Invention

This invention relates to lasers, and more particularly to the use of a certain class of dyes as lasing media for dye lasers and laser devices.

2. Description of the Background

Many of the materials discovered thus far which are capable of acting as lasing media have been in the solid or gaseous state. Solid lasers typically suffer from such disadvantages as cracking and optical imperfections. It is also known that certain organic dyes in solution can operate as "liquid" or "organic dye" lasers. Of the range of materials useful as lasing media, organic lasing dyes have certain advantages. A wide range of organic dye lasers is available to provide stimulated emission (lasing) over a broad range of the spectrum. In addition, organic dye lasers are generally capable of being tuned to emit over a range of wavelengths, this being in contradistinction to the essentially single wavelength capability of lasing emission characterizing gas and solid lasers. Moreover, organic dye lasers provide an economical lasing medium when compared to gas and many solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths substantially along the entire fluorescence band of the dye by interposing a dispersive element such as a diffraction grating or a prism.

The operation of a laser is achieved as a result of the phenomenon that excited atoms or molecules can emit a photon or quantum of light. This photon or quantum can itself trigger another excited atom or molecule to emit its photon prematurely. This process is called designated stimulated emission.

The excitation of organic lasing dyes can be achieved by subjecting the dye, under controlled conditions such as will be described herein, to a suitable source of energy. One example of a source of energy is bombarding with electrons or illuminating with a high energy source. Conventionally, illumination is utilized for liquid laser materials. Excitation of a liquid laser medium by illumination is generally termed "optical pumping" or merely "pumping." Pumping sources include, for example, sources such as giant pulse lasers, xenon and argon arc flash tubes, as well as arc discharge tubes containing only air or other gaseous mixtures. Similar laser action is expected in a solid polymer medium when it is pumped optically and being contained in a laser cavity.

Various arrangements of laser apparatus can be used. A laser structure particularly adapted for organic dye liquid laser media is described by Sorokin, et al., IBM Journal II:148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during the lasing operation. Thus, localized heating which can cause refractive discontinuities and potential breakdown of the dye is effectively prevented. To provide an energy source for exciting the atoms of the laser material, the laser body may be surrounded concentrically by a lamp, such as one containing an annular region within an outer thick-walled quartz cylinder. The annular region may contain an air-argon mixture and have electrodes which are operably connected to a low inductance capacitor charged by a standard high voltage supply. Desirably, coaxially disposed at either end of the optically resonant cavity are opposed internally reflective cavity ends such as mirrors. When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet (designated $S^0$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^0$) to a high energy level from which emissive transition occurs.

In operation, the molecular electrons of the laser medium are desirably "pumped" to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or non-radiatively from $S^1$ to $S^0$, non-radiatively from $S^1$ to a triplet state and then radiatively or non-radiatively from the lowest excited triplet state to $S^0$. Generally, laser emission consists of optical emission resulting from transitions from $S^1$ to various vibrational modes of $S^0$. Susceptibility to triplet formation upon pumping is deleterious due to typical non-radiative energy losses resulting from triplet to $S^0$ transitions. Moreover, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules remaining at the initial low energy level, a condition conventionally designated "population inversion" or "inversion of energy states."

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emmissive transitions. A rising pulse of bidirectionally reflective light quickly develops in the cavity reaching a quantitatively large value as the induced emissive transition of molecules from the high energy level population increases. If one of the reflective cavity ends is partially transmissive, as is typically the case, a portion of the intense reflected light pulse passes through the one end and out of the cavity to constitute the laser output light pulse or the laser beam.

As mentioned previously, organic dye lasers have many advantages over solid and gas lasers. However, depending upon the wavelength of lasing desired, one must choose entirely different classes of dyes to obtain the appropriate result.

Conducting polymers were discovered in the late 1970s, suggesting the possibility of combining the important electronic and optical properties of semiconductors and metals with the attractive mechanical properties and processing advantages of polymers. Initial efforts to this end were discouraging since the new conducting polymers exhibited several undesirable properties including among others insolubility, intractability, relatively poor mechanical properties and moreover such polymers were non-melting.

More recently, specific conjugated polymers systems have been rendered more soluble and processable. For example, the poly(3-alkylthiophene) derivatives (P3ATs) of polythiophene are soluble and meltable with alkyl chains of sufficient length, and the P3ATs have been processed into films and fibers. However, due to the moderate molecular weights and/or the molecular structures of these polymers, the mechanical properties, particularly the modulus and tensile strength of fibers and films made from these polymers are insufficient to enable their use in many applications.

Alternative methods of processing conductive polymers have been developed. For example, poly(-phenylenevinylene), PPV, and the alkoxy derivatives of PPV are synthesized via the precursor polymer route.

Other efforts have been directed to the development of p-polyphenylenevinylene, PPV, polymers which are soluble in the final conjugated form. Poly(dihexyloxy phenylenevinylene), DHO-PPV, is not soluble in common organic solvents at room temperature, but is soluble at temperatures above 80° C. The longer side-chain octyloxy derivative, DOO-PPV, was found to be less soluble in most non-polar solvents, probably because of side chain interdigitation and "side chain crystallization".

Materials available for use as chromophores in dye lasers have been small conjugated organic molecules, used either in solution or in blends with various host materials such as amorphous polymers, sol-gel glasses, etc. For example, coumarin dyes such as umbelliferone are useful in the short wavelength region, fluorescein is useful in the medium wavelength region, and rhodamines, such as Rhodamine 6G, are useful in the longer wavelength region, as are long chain cyanine dyes, such as 3,3'-diethylthiatricarbocyanine iodide.

Recently, a new class of conducting (conjugated) polymers has emerged which offers opportunities for applications in photonics. Within this class, polyphenylenevinylene and its derivatives are particularly promising, for they exhibit both photoluminesence and electroluminescence. Light emitting Schottky diodes made of (2-methoxy, 5-(2'-ethyl-hexyloxy-p-phenylenevinylene), MEH-PPV, in contact with calcium have been demonstrated with quantum efficiency of approximately 1% and with good brightness. The relatively high quantum yield for photoluminescence suggests the possibility of achieving polymer lasers in various forms: for example, dye lasers using the conjugated polymer as the active chromophore either in solution or in blends with another host polymer or any other suitable host material, as well as solid polymer diode lasers. This technology was disclosed in U.S. application Ser. No. 07/635,455 entitled PROCESS FOR FORMING POLYMERS, filed on Dec. 17, 1990 by Wudl. et al.

From a synthesis stand point, it can be readily appreciated that generally it is less expensive to manufacture various members of a single class of dyes than to manufacture several distinct classes of dyes in order to obtain the desired wavelengths of lasing.

Accordingly, there is a need in the art for a class of conductive dye laser and laser devices having superior lasing characteristics without the disadvantages and draw backs of the prior art.

SUMMARY OF THE INVENTION

This invention relates to a dye laser, comprising
a laser dye solution comprising a conductive polymer having the chemical formula

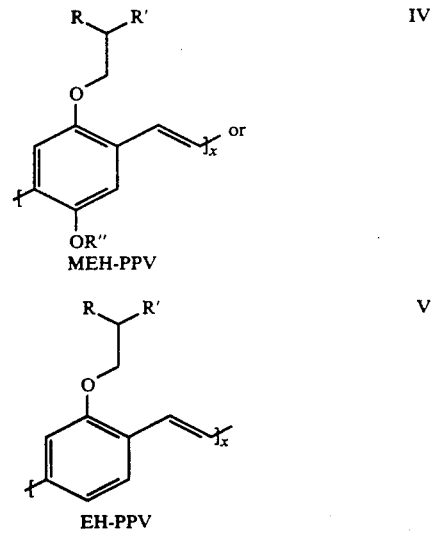

wherein R comprises $(C_1-C_{10})$alkyl, R' is the same or different from R and comprises alkyl, substituted alkyl, benzyl, or substituted benzyl, such as $(CH_2)_nCH_3$ or $CH_2C_6H_4(CH_2)_nY$, wherein Y is O-alkyl, alkyl, alkenyl or alkynyl and n is greater than 1 and up to 200, and for structure IV R" is the same or different from R and comprises $(C_1-C_{10})$alkyl, and x is a number greater than about 20, and a non-aqueous solvent; the solvent being unable to chemically react with the polymer and unable to absorb and emit light at a wavelength similar to the conductive polymer; and a pumping energy source operably coupled therewith and capable of producing stimulated emission of the dye solution.

This invention also relates to a method of producing a coherent laser emission in the operation of a dye laser in the wavelength range of about 550 to 660 nm comprising placing in an optically resonant cavity, and optically pumping, a laser dye solution to produce a population inversion in the laser dye solution with resulting stimulated emission, the laser dye solution comprising a conductive polymer having the chemical formula

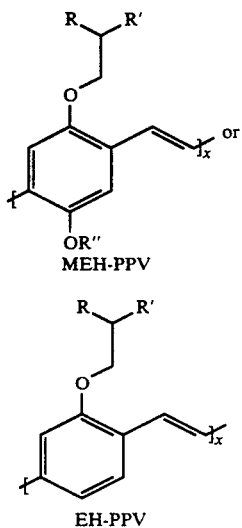

MEH-PPV

EH-PPV wherein R comprises $(C_1-C_{10})$alkyl, R' is the same or different from R and comprises alkyl, substituted alkyl, benzyl, or substituted benzyl, such as $-(CH_2)_nCH_3$ or $CH_2C_6H_4(CH_2)_nY$, wherein Y is O-alkyl, alkyl, alkenyl or alkynyl and n is greater than 1 and up to 200, and for structure IV R" is the same or different from R and comprises $(C_1-C_{10})$alkyl, and x is a number greater than about 20, and a non-aqueous solvent; the solvent being unable to chemically react with the polymer and unable to absorb and emit light at a wavelength similar to those of the conductive polymer.

Also part of this invention is a laser device, comprising a solid body formed of a conductive polymer having the chemical formula

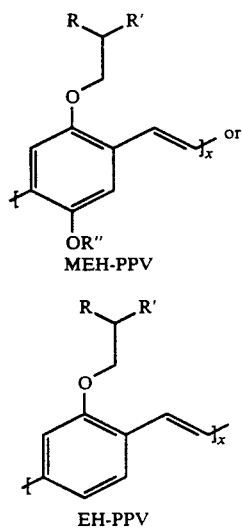

MEH-PPV

EH-PPV wherein R comprises $(C_1-C_{10})$alkyl, R' is the same or different from R and comprises alkyl, substituted alkyl, benzyl, or substituted benzyl, such as $-(CH_2)_nCH_3$ or $CH_2C_6H_4(CH_2)_nY$, wherein Y is O-alkyl, alkyl, alkenyl or alkynyl and n is greater than 1 and up to 200, and for structure IV R" is the same or different from R and comprises $(C_1-C_{10})$alkyl, and x is a number greater than about 20, and a host polymer; the host polymer being unable to chemically react with the conductive polymer and unable to absorb and emit light in a wavelength similar to the conductive polymer;

means for pumping said body to generate light therein; and means for creating distributed feedback of the light to achieve a substantially coherent beam of light which is emitted from the body.

This invention also encompasses a method of producing a coherent laser emission in the operation of the diode laser device of this invention in the wavelength range of about 550 to 660 nm comprising electrical bias pumping a laser diode device to produce a population inversion in the laser diode device with resulting stimulated emission.

A more complete appreciation of the invention and many of the attendant advantages thereof will be readily perceived as the same becomes better understood by reference to the following detailed description when considered in connection with the accompanying figures.

BRIEF DESCRIPTION OF THE DRAWINGS

FIG. 1 is a schematic diagram of the experimental setup of the MEH-PPV laser cavity in transverse cavity configuration, the pumping laser source and detector.

FIG. 2 is a graph showing the output pulse energy of the dye laser versus the input pulse energy for the following chromophores: ●-MEH-PPV at a concentration of 0.21 mg/ml; ■-MEH-PPV at a concentration of 1.24 mg/ml; ▲-Rhodamine 6G at a concentration of 2 millimole/l. The lowest output values indicate the threshold energies for laser action.

FIG. 3 is a graph showing a comparison of the spontaneous emission spectra of the MEH-PPV chromophore (measured without one of the external cavity mirrors in diluted solution) to spectrum of the MEH-PPV laser (measured with the two external cavity mirrors, in a more concentrated solution on the order of 1 mg/ml).

FIG. 4 is a front planar view of a laser device in accordance with the present invention.

FIG. 5 is a perspective view of another embodiment of a laser device in accordance with the present invention.

FIG. 6 is a front planar view of another embodiment of a laser device in accordance with the present invention.

FIG. 7 shows the emission curves for an EH-PPV and a MEH-PPV polymer.

Other objects, advantages and features of the present invention will become apparent to those skilled in the art from the following discussion.

DESCRIPTION OF THE PREFERRED EMBODIMENTS IN RELATION TO THE DRAWINGS

This invention arose from a desire by the inventor to provide a novel and useful dye laser that has a quantum yield superior to most of the others currently available and comparable to that of Rhodamine 6G. The dye laser of this invention has a high quantum efficiency in the solid state as well as in solution.

The dye laser of this invention utilizes a reservoir means containing a laser dye solution and a pumping energy source capable of producing simulated emission of the solution which comprises a lasing concentration of dye in a non-interfering solvent, i.e., one that does not inhibit stimulated emission, of a polyphenylenevinylene dye.

A class of polyphenylenevinylene polymer dyes are provided herein that are useful as lasing media. This class of dyes includes various individual dyes which, upon stimulated emission have differing wavelengths of lasing. Thus, minor modifications of the basic class of dyes provided herein results in dye lasers which will emit in any preselected region of the visible UV and near IR spectrum.

In a dye laser apparatus, the lasing medium may be readily changed merely by removing the dye solution from the lasing cavity, cleaning the cavity and adding a new dye solution. This ease of interchange of dyes also allows for great flexibility in the apparatus to readily select any desired wavelength of lasing.

This invention provides a dye laser, that comprises
a laser dye solution comprising a conductive polymer having the chemical formula

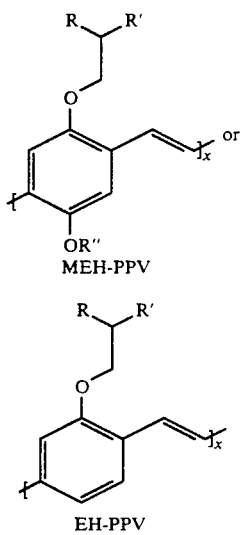

wherein R comprises ($C_1$-$C_{10}$)alkyl, R' is the same or different from R and comprises alkyl, substituted alkyl, benzyl, or substituted benzyl, such as —$(CH_2)_nCH_3$ or $CH_2C_6H_4(CH_2)_nY$, wherein Y is O-alkyl, alkyl, alkenyl or alkynyl and n is greater than 1 and up to 200, and for structure IV R" is the same or different from R and comprises ($C_1$-$C_{10}$)alkyl, and x is greater than about 20, and a non-aqueous solvent; the solvent being unable to chemically react with the polymer and unable to absorb and emit light at a wavelength similar to the conductive polymer; and
a pumping energy source operably coupled therewith and capable of producing stimulated emmission of the dye solution.

In one aspect of the invention of the dye laser described herein, the wavelength of the pumping energy source comprises about 400 to 900 nm, and more preferably for the MEH-PPVs about 500 to 800 nm and for the EH-PPVs about 400 to 600 nm. In another aspect, the wavelength of the stimulated emission comprises about 550 to 800 nm, and more preferably for the MEH-PPV about 600 to 800 nm and for the EH-PPV about 450 to 600 nm. Upon improvement of the quality of the sample, as observed in stretched aligned films of MEH-HPPV-blended in polyethylene, the luminescence can be extended up to 800 nm, and over, and a longer wave length pumping source.

The dyes useful in this invention have the chemical formula

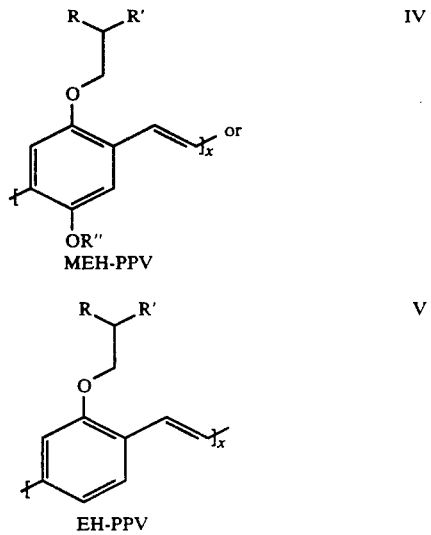

wherein R comprises ($C_1$-$C_{10}$)alkyl, R' is the same or different from R and comprises alkyl, substituted alkyl, benzyl, or substituted benzyl, such as —$(CH_2)_nCH_3$ or $CH_2C_6H_4(CH_2)_nY$, wherein Y is O-alkyl, alkyl, alkenyl or alkynyl and n is greater than 1 and up to 200, and for structure IV R" is the same or different from R and comprises ($C_1$-$C_{10}$)alkyl, and x is a number greater than about 20 and preferably greater than about 30.

Examples of preferred compounds include, among others, those having the following substituents.

R may be selected from the group consisting of —$CH_3$, —$CH_2CH_3$, and —$CH(CH_3)_2$, R' may be selected from the group consisting of —$(CH_2)_nCH_3$, and —$CH_2C_6H_4(CH_2)_nY$; wherein Y is a group compatible with PPV polymerization such as —$OCH_3$, —$CH=CH_2$, or —$C≡CH$, and n is a number greater than 1 and up to 200 or greater.

The polymers utilized herein may be prepared as disclosed in U.S. application Ser. No. 07/635,455 entitled "PROCESS FOR FORMING POLYMERS" filed on Dec. 27, 1990. by Wudl et al. However, other methods may be utilized as well.

Briefly, the polymers of the invention, poly(2-methoxy,5-(2'-ethylhexyloxy)-p-phenylene vinylene), MEH-PPV, and related poly(phenylenevinylene) polymer compounds, described above may be produced by at least two methods described in the Wudl et al. application, the entire pertinent text of which is incorporated herein by reference. These include an abbreviated synthesis which leads directly to the polymer, and a precursor polymer route to obtain the polymer.

An abbreviated synthesis method is provided in the following scheme.

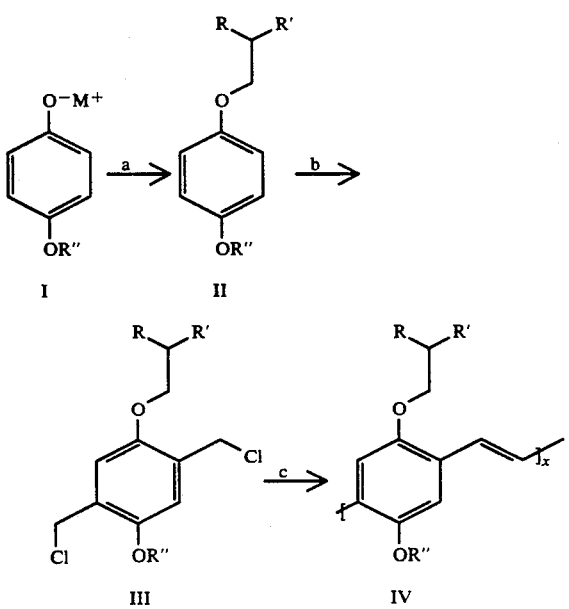

wherein

R comprises (C$_1$-C$_{10}$)alkyl;

R' is the same or different from R and is selected from the group consisting of alkyl, substituted alkyl, benzyl and substituted benzyl such as —(CH$_2$)$_n$CH$_3$ or —CH$_2$C$_6$H$_4$(CH$_2$)$_n$Y, wherein Y is O-alkyl, alkyl, alkenyl or alkynyl and n is greater than 1 and up to 200, and for structure IV R" is the same or different from R and R' and comprises (C$_1$-C$_{10}$) alkyl; and x is any number greater than about 20.

Examples of preferred compounds include among others the following substituents.

R may be selected from the group consisting of —CH$_3$, —CH$_2$CH$_3$ and —CH(CH$_3$)$_2$.

R' may be selected from the group consisting of —(CH$_2$)$_n$CH$_3$, and —CH$_2$C$_6$H$_4$(CH$_2$)$_n$Y, wherein Y is a group compatible with PPV polymerization such as —OCH$_3$, —CH=CH$_2$, or —C≡CH, and n is a number greater than 1 and up to 20.

a may be ZCH$_2$R'R, wherein Z is a leaving group and R and R' are as defined above.

As used herein the term "leaving group" refers to a compound which is displaced and is more electronegative than carbon. Usually the leaving group comprises a halogen such as Cl, Br, I, sulfonic esters such as alkane sulfonate or p-toluenesulfonate. However, other groups are also suitable.

The compound a may be provided in a mixture with an alcohol, preferably methanol, or ethanol.

The compound b may be formaldehyde in the presence of HCl.

The compound c may be t-BuOK, t-BuONa, or t-BuOLi in the presence of tetrahydrofuran, THF, and the like.

The conductive polymers used in this invention have a poly(phenylenevinylene)backbone with specifically designed substituents to attain the described properties. Preferred substituents are methoxy and branched alkoxide. However, other substituents are also suitable.

As noted above, the first step in forming the polymers of the invention according to the abbreviated synthesis method is to synthesize compound I, for example p-methoxy sodium phenoxide. This may be done by any convenient method known to those skilled in the art. Generally, 4-alkoxyphenol is used as the starting material which is dissolved in a solvent such as an alcohol and refluxed with an alkli metal hydroxide to produce compound I.

The resulting solution may be cooled to below 80° C. and preferably to room temperature and then mixed with compound a in the presence of a solvent, preferably an alcohol such as ethanol. The method of addition is not critical. This step may be followed by refluxing until compound II is formed. This is usually accompanied by a color change.

The solvent is removed from compound II, for example by evaporation, to produce a solid and an oily liquid. This mixture is washed several times with an alkali metal hydroxide and water. This step is followed by drying, for example over MgSO$_4$ and then removal of the solvent, for example by evaporation, to produce a typically yellow oil of Compound II. This relatively crude compound II is then distilled under vacuum to produce a clear, viscous liquid.

Compound II may then dissolved in a solvent, for example p-dioxane, and cooled to 0°-5° C. Concentrated HCl and an aqueous formalin solution are added. Anhydrous HCl is then bubbled through the resulting solution and the reaction mixture allowed to warm to room temperature. The mixture may be stirred for 1.5 to 2 hours.

Formalin is again added and anhydrous HCl bubbled through for 5-10 minutes at 0°-5° C. Stirring may be continued for 1 hour and this step repeated 2-3 times, after which the reaction mixture is stirred for 16 hours. At the end of this time the reaction mixture may be refluxed for 3-4 hours.

The mixture is then cooled and the solvent removed to produce a typically "greasy" solid. This material is dissolved in a minimum amount of warm solvent, for example, warm hexanes and precipitated by adding an alcohol, for example, methanol until the solution becomes cloudy.

The resulting mixture is cooled, filtered, and washed with cold alcohol, such as methanol, to produce Compound III.

Compound III is then dissolved in a solvent, preferably anhydrous THF. A solution of potassium tert-butoxide in anhydrous THF is then added dropwise with stirring at room temperature. It is critical to add the base to compound III in order to produce the desired soluble compound. If the solution of compound III is added to the base, an insoluble compound in the form of a gel of the same empirical formula is produced.

The resulting mixture may be stirred at ambient temperature for 24 hours. At the end of this time the mixture is poured into an alcohol and stirred. This causes Compound IV to precipitate. The typically red-orange precipitate of Compound IV is washed with distilled water and reprecipitated from a THF/methanol mixture and dried under vacuum.

The process steps are given for the specific preparation of poly (2-methoxy, 5-(2'-ethyl-hexyloxy)-p-phenylene vinylene), MEH-PPV. However, the process is not limited to the production of poly(2-methoxy,5-(2'-ethylhexyloxy)-p-phenylene vinylene), MEH-PPV. As noted above, various related poly(phenylenevinylene) polymers can be produced depending upon the identity of R, R', R", a, b, and c.

Representative useful non-interfering solvents which do not inhibit stimulated emission are xylene, methanol, chloroform, toluene, chlorobenzene, tetrahydrofuran, chlorobenzene and dichlorobenzene. However others may also be utilized.

Of course, combinations of the liquid solvents may also be used as well as other solvents known to be useful in the dye laser art. The particular solvent or combinations of solvents used, of course, will depend in part on the solubility of the dye used.

As used herein, the term "lasing concentration" refers to a concentration sufficient to promote, under appropriate conditions such as those mentioned herein, stimulated emission of the laser dye solution. Generally, a concentration of the conductive polymer of about 0.01 to 20 mg/ml is employed, with a concentration of about 0.1 to 10 mg/ml being preferred for maximum output energy. Concentrations outside of this range, however, may be used for particular operations, if desired.

The dye laser of this invention has a high quantum efficiency in solution as well as in the solid state. In some instances the quantum efficiency is close to unity.

Preferred conductive polymers for use to the present invention are those MEH-PPV and EH-PPVs, wherein R is selected from the group consisting of —$CH_3$, —$CH_2CH_3$ and —$CH(CH_3)_2$;

R' is the same or different from R and is selected from the group consisting of —$(CH_2)_nCH_3$, and —$CH_2C_6H_4(CH_2)_nY$, where Y is —$OCH_3$, —$CH=CH_2$, and —$C\equiv CH$, and n is greater than 1 and up to 20; and in the case of the chemical structure (IV)

R" is the same or different from R and R' and is selected from —$CH_3$, —$CH_2CH_3$ and —$CH(CH_3)_2$.

In one prefered embodiment, the lifetime of luminescence of the dye laser solution that is less than about 100 picoseconds, and in some instances less about 85 picoseconds. However, other lifetimes of luminescence are also attainable.

Also provided herein is a method of producing a coherent laser emission in the operation of a dye laser in the preferred wavelength range of about 550 to 800 nm comprising placing in an optically resonant cavity and optically pumping a laser dye solution to produce a population inversion in the laser dye solution with resulting stimulated emission, a laser dye solution comprising a laser dye solution comprising a conductive polymer having the chemical formula

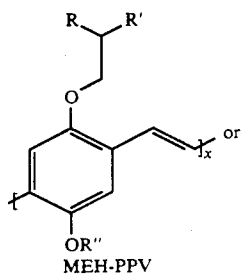

MEH-PPV

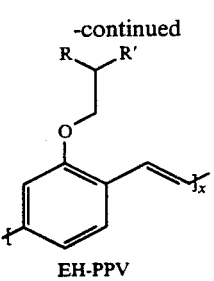

EH-PPV wherein R comprises ($C_1$-$C_{10}$)alkyl, R' is the same or different from R and comprises alkyl, substituted alkyl,- benzyl, or substituted benzyl, such as —$(CH_2)_nCH_3$ or $CH_2C_6H_4(CH_2)_nY$, wherein Y is O-alkyl, alkyl, alkenyl or alkynyl and n is greater than 1 and up to 200, and for structure IV R" is the same or different from R and comprises ($C_1$-$C_{10}$)alkyl, and x is greater than about 20, and a non-aqueous solvent; the solvent being substantially unable to chemically react with the polymer and unable to absorb and emit light at a wavelength similar to those of the conductive polymer; and a pumping energy source operably coupled therewith and capable of producing stimulated emission of the dye solution.

The method of this invention may be practiced with the polymers described above.

Also provided herein is a laser device that comprises a solid body formed from a conductive polymer having the chemical formula

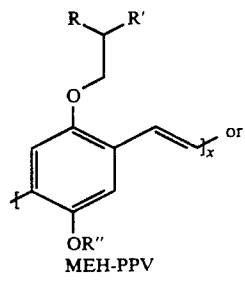

MEH-PPV

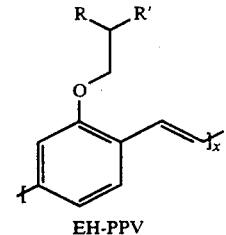

EH-PPV wherein R comprises ($C_1$-$C_{10}$)alkyl, R' is the same or different from R and comprises alkyl, substituted alkyl, benzyl, or substituted benzyl, such as —$(CH_2)_nCH_3$ or $CH_2C_6H_4(CH_2)_nY$, wherein Y is O-alkyl, alkyl, alkenyl or alkynyl and n is greater than 1 and up to 200, and for structure IV R" is the same or different from R and comprises ($C_1$-$C_{10}$)alkyl, and x is greater than about 20, and a host polymer; the host polymer being substantially unable to chemically react with the polymer and unable to absorb and emit light at a wavelength similar to the conductive polymer;

means for pumping the body to generate light therein; and means for creating distributed feedback of the light to achieve a substantially coherent beam of light which is emitted from the body.

The device of the invention utilizes a conductive polymer and a host polymer, the conductive polymer being present in the conductive polymer at a concentration of about $10^{-4}$ to $10^{-1}$M, and more preferably about $5 \times 10^{-4}$ to $10^{-2}$M. However, other proportions are also suitable as long as there is enough conductive polymer present so that the body is conductive.

The diode device of this invention may utilize an electrical energy source having a voltage of about 0.01 to 100 Volts, and more preferably about 0.01 to 10 Volts. However, other voltages are also suitable.

The device of the invention utilizes any and all of the polymers provided herein, such as poly(1,4-phenylene vinylene) or PPV. While PPV is not soluble in some solvents, a series of its (2,5-alkoxy) derivatives are, including poly(2,5-hexoxy-PV), poly(2,5-octoxy-PV), poly(2-methoxy,5(2'-ethyl-hexyloxy PV), and the like. Other derivatives suitable for use herein are DMOP-PPV having one phenyl ring attached to the phenyl of the PPV and the PPPV with two phenyl rings attached to the phenyl of the PPV. In addition to the above, a cPPEPV conductive polymer is also suitable for use herein. This polymer has the following chemical structure.

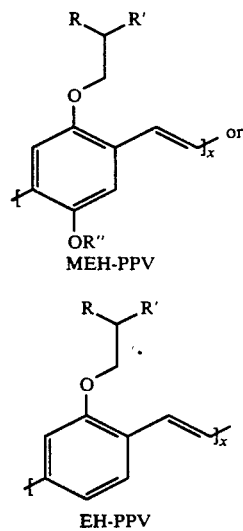

MEH-PPV

EH-PPV comprises alkyl, substituted alkyl, benzyl, or substituted benzyl, such as —$(CH_2)_nCH_3$ or $CH_2C_6H_4(CH_2)_nY$, wherein Y is O-alkyl, alkyl, alkenyl or alkynyl and n is greater than 1 and up to 200, and for structure IV R" is the same or different from R and comprises $(C_1-C_{10})$alkyl, and x is greater than about 20, and a non-aqueous solvent; the solvent being substantially unable to chemically react with the polymer and unable to absorb and emit light at a wavelength similar to the conductive polymer.

This invention is an effort in the field of lasers attempting to incorporate conductive chromophores or laser dyes into various host materials, in one of the embodiments. The most promising hosts are solgels, and preferable are those described by Wong and Karasz, Polymer 32(4):605(1991) and Knobe et al, Applied Optics 29(18):2729(1990), the texts of these references relating to these host polymers being incorporated herein by reference.

The laser device of this invention is preferably made from a host polymer comprising one or more of polymethylmethacrylate (PPMA), polycarbonate, polyethylene, polyvinyl alcohol, polyurethane, polystyrene, modified polymethylmethacrylate, epoxies, polyesters, tetramethoxysilane, methyl, methacrylate ethylene glycol, 3-(trimethoxysilyl)propyl methacrylate and 3-glycidoxy propyl trimethoxysilane. However, other polymers known in the art as suitable for use as host polymers may also be utilized.

Briefly, preferred host polymers are TMOS, MMA, TMSPM, e.g., in a mixture in 0.04N HCl of a molar proportion of 1:1:1:1, and TMOS, EG, GPTMS in 0.04N HCl in a molar proportion of 1:1:1:4.5, and TMOS, MMA, EG, TMSPM, and GPTMS in 0.04N HCl in a proportion of 3:1.5:3:1.5:3:16, among others. Other host materials are also suitable such as optically transparent polymers such as polymethyl methacrylate, modified PMMA, polyurethane, polyethylene, polystyrene, epoxies, mylar, polyesters, polycarbonates, and the like. However, other host polymers are also suitable.

In terms of the quantum yield required for laser action, the higher the quantum yield the better the preparation acts as a laser dye. Preferred quantum yields are in the range of about 0.2 to 1.0, and more preferably 0.3 to 1.0. However, other quantum yields are also suitable.

The lifetime of the luminescence of the conductive polymer of this invention in solution is up to about 100 picoseconds, and sometimes higher.

The range of wavelengths produced by the solution comprising the MEH-PPV polymers of the invention provides a luminescence spectrum of about 500 to 800 nm, and more preferably about 570 to 630 nm. However, under some conditions the range may be broader. Different derivatives of the PPV polymer cover different output wavelength regions. For example EH-PPV itself lases at about 400–600 nm.

The laser device of this invention may be used in any apparatus known in the art. The polymer laser, in liquid or solid form, may be used for a variety of applications requiring an output wavelength compatible with any of the polymer derivatives disclosed herein.

One preferred embodiment of the laser device of the invention is that wherein the means for creating the distributive feedback comprises a grating.

Still another embodiment of this invention provides a laser device with a grating that further comprises a substrate having a surface, and wherein the grating is on the surface of the substrate and the body is on the surface of the substrate and over the grating.

The laser device of the invention preferably has a body that comprises a layer of the conductive polymer of the invention. Preferred is a conductive polymer selected from the group consisting of EH-PPV and MEH-PPV themselves wherein R, R' and R" are alkyl. However, other polymers may also be utilized for this layer.

In another preferred embodiment, the means for pumping the body comprises and optical pumping means. In still another preferred embodiment the means for pumping the body comprises a pair of contacts and means for applying a voltage across the body between the contacts. In another preferred embodiment the body has a pair of opossed surfaces and a separate contact is on each of the surfaces.

In still another preferred embodiment of the laser device of this invention, the means for creating distributive feedback comprises one contact in the form of a plurality of strips spaced along the surface of the body with a periodicity matched to the emission wavelength of the body.

In another of the preferred embodiments of the laser device disclosed herein the means for creating a cavity comprises a pair of spaced mirrors.

In another aspect of the laser device of this invention, at least one of the contacts is at least partially transparent to a lower light to pass therethrough.

Also part of this invention is a method of producing a coherent laser emission in the operation of a diode laser in the wavelength range of about 480 to 660 nm comprising placing in an optically resonant cavity and optically pumping a laser diode to produce a population inversion in the laser diode with resulting stimulated emission, the laser diode comprising the laser device of this invention described above.

The following examples are included for further understanding of the invention. Unless otherwise stated, the excitation source in the following examples is a giant pulse from a 530 nm frequency doubled, neodymium glass laser. The dye lasing medium is placed in a cuvette which is located between two dielectric mirrors which form a nearly hemispherical or flat dye laser cavity. The light from the excitation or pumping source passes through one of the dielectric mirrors into the dye containing cuvette and along the optical axis of the cavity. A beam splitter is used to sample the output from the excitation source in order to determine the wavelength of lasing. Transverse optical pumping perpendicularly to the laser output direction is possible as well.

The present invention demonstrates for the first time a laser made from a conducting polymer, e.g., of the polyphenylenevinylene (PPV) family. This genus is exemplified below by means of (2-methoxy, 5-(2'-ethylhexyloxy-p-phenylenevinylene)or MEH-PPV in a solution of an organic solvent, and its performance is compared to that of Rhodamine 6G in solution under similar conditions. The observation of a defined threshold power and the small divergence of the light emanating from the optical cavity above threshold as well as a narrowed spectrum of laser output are clear indications of laser action.

Having now generally described this invention, the same will be better understood by reference to certain specific examples, which are included herein for purposes of illustration only and are not intended to be limiting of the invention or any embodiment thereof, unless so specified.

The dye cell (1) is schematically displayed in FIG. 1. It is constituted of a glass cuvette (2) which contains the MEH-PPV polymer solution (3) in different common organic solvents, chlorinated hydrocarbons and aromatic solvents such as xylene, toluene, chlorobenzone, tetrahydrofuran (THF) or chloroform.

The cell (2) was pumped repetitively by light pulses (4) generated from the second harmonic radiation of a Q-switched Nd:YAG laser (5) (wavelength: 534 nm, pulse width: 6 ns, repetition: 10 Hz). The pumped light (4) was focussed onto the dye solution (3) by a cylindrical lens (6) which created a narrow ($-200$ μm) optically excited region across the cuvette (8). The laser cavity is defined by two flat dielectric mirrors (7) with reflection coefficients of 100% and 97% at $\lambda=600$ nm in this example which were attached to the faces of the cuvette (8) in the configuration depicted in FIG. 1.

The efficiency of the polymer dye laser of the invention in solution (3) was compared to that of Rhodamine 6G in solution at 115 mg/l concentrations, using methanol as a solvent.

FIG. 2, depicts the output power as a function of the input pump power for two different concentrations of MEH-PPV in the cavity and for a Rhodamine 6G solution. The measurements for both solutions were obtained under identical experimental conditions. Only the dye cells were changed.

As can be seen from the data shown in FIG. 2, the efficiency of the MEH-PPV polymer as the active gain medium in the laser is similar to that of Rhodamine 6G, which is among the most efficient known laser dyes.

For the more dilute MEH-PPV solutions, the laser output power increases faster with increasing light excitation power. This may arise from the higher efficiency of the radiative recombination channel when the polymer molecules are more dilute and thus separated spatially. A lower threshold for laser action is obtained with the more concentrated MEH-PPV solution in accordance with this invention.

Additional evidence for laser action was obtained by comparing the spectral line shape of the laser to the spectrum of the spontaneous emission of the MEH-PPV solution measured after one of the cavity mirrors was removed.

A significant reduction in the spectral line width occurred in the laser output, as is shown in FIG. 3. The feature centered at $\lambda=532$ nm results from pump radiation which leaked into the spectrometer. The line width of the MEH-PPV laser was about twice that of the doubled Nd:YAG laser used as the pump. The spontaneous emission spectra could be measured only in relatively dilute solutions. In concentrated solutions such as the one shown in FIG. 2, or in more concentrated solutions, laser action was achieved without external mirrors, due to reflection from the bare cuvette walls.

This indicates a significant high efficiency for the MEH-PPV laser as well as a decrease of the threshold for laser action as the solution concentration increases.

The temporal behavior measurements of the MEH-PPV laser indicates that its waveform is similar to that of the doubled Nd:YAG pump laser. This is consistent with the inherently fast stimulated emission process governing the output radiation from the cavity.

Now, referring to FIG. 4, there is shown a laser device 10 in accordance with the present invention. Laser 10 comprises a substrate 12 of an insulating material, such as glass or other substrate. On a surface of the substrate 12 is a grating 14 formed of a plurality of V-shaped grooves 16 spaced along and extending across the surface of the substrate 12. The body 18 of MEH-PPV is on the surface of the substrate 12 and over the grating 14. The body 18 is a solid layer of MEH-PPV, or a blend of MEH-PPV with another polymer, sol-gel, etc.

In the operation of the laser 10, the body 18 is pumped optically as indicated by the arrows 20. This causes the generation of light in the body 18. The grating is of a period so as to result in distributed feedback of the generated light. This causes the light to flow back and forth in the body 18 and thereby generate a substantially coherent beam of light which is emitted from one or both ends of the body 18 as indicated by the arrows 22.

Referring to FIG. 5, there is shown another laser device 24 in accordance with the present invention. Laser 24 comprises a solid body 26 of MEH-PPV having opposed surface 28 and 30. On the surface 28 is a conductive contact 32, which may be made of a metal such as calcium which is known to yield an efficiency of about 1% in a light emitting Schottky diode configuration and creates periodical amplification (or pumping) that is known to provide lasing conditions. The contact 32 has a terminal portion 34 along one edge of the surface 28 and a plurality of spaced, parallel strips 35 extending from the terminal portion across the surface 28. A conductive contact 38 is on the surface 30 of the body 26.

In the operation of the laser 24, the body is electrically pumped by connecting the contacts 32 and 38 to a source of current so as to apply a voltage across the body 26 between the contacts 32 and 38. This voltage causes light to be generated in the body 26. The strips 36 of the contact 32 are spaced apart a distance so as to match the emission wavelength of the material of the body 26. This results in distributed feedback of the light in the body 26 so as to create a substantially coherent beam of light which is emitted from the body 26 through the sides of body 26.

Referring to FIG. 6, there is shown still another semiconductor-metal junction laser device 40 in accordance with the present invention. Laser 40 comprises a body 42 of MEH-PPV having a pair of opposed surfaces 44 and 46. Conductive contacts 48 and 50 are on the surfaces 44 and 46 respectively. The contacts 48 and 50 are of a conductive material which is optically reflective with at least one of the contacts 48 and 50 being at least partially transparent. Terminal wires 52 and 54 are connected to the contacts 48 and 50, respectively.

In the operation of the laser 40, the body 42 is electrically pumped by connecting the terminal wires 52 and 54 to a source of voltage so as to apply a current across the body 42 between the contacts 48 and 50. This causes the generation of light at the semiconductor-metal junction 44 or 46. The reflective contacts 48 and 50 cause the light to be reflected back and forth across the body 42 so as to achieve laser action. This results in the formation of a substantially coherent beam of light which is emitted through the contact 48 or 50 which is partially transparent.

FIG. 7 shows EH-PPV and MEH-PPV curves stretching over wavelengths of about 450 to 660 nm (EH-PPV) and about 570 to over 800 nm (MEH-PPV).

The invention now being fully described, it will be apparent to one of ordinary skill in the art that many changes and modifications can be made thereto without departing from the spirit or scope of the invention as set forth herein.

What is claimed as novel in Letters Patent of the United States is:

1. A dye laser, comprising:
   a laser dye solution disposed in a resonant cavity comprising a conductive polymer having the chemical formula:

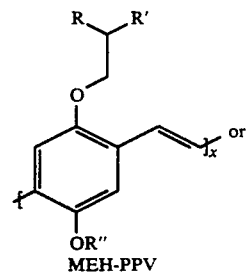

MEH-PPV

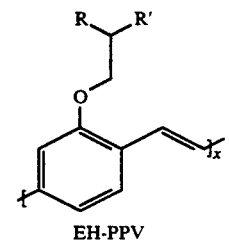

EH-PPV wherein R comprises $(C_1-C_{10})$alkyl, R' is the same or different from R and comprises alkyl, substituted alkyl, benzyl, or substituted benzyl, the substituted compounds selected from the group consisting of $-(CH_2)_nCH_3$ and $-CH_2C_6H_4(CH_2)_nY$, wherein Y is O-alkyl, alkyl, alkenyl or alkynyl and n is greater than 1 and up to 200, and for structure IV, R'' is the same or different from R and comprises $(C_1-C_{10})$alkyl, and x is greater than about 20 and up to about 200; and a non-aqueous solvent; the solvent being substantially unable to chemically react with the polymer and to absorb and emit light at a wavelength similar to the conductive polymer and a pumping energy source producing stimulated emmission in the dye solution.

2. The dye laser of claim 1, wherein
   the wavelength of the pumping energy source comprises about 400 to 900 nm.

3. The dye laser of claim 1, wherein
   the wavelength of the stimulated emission comprises about 550 to 800 nm.

4. The dye laser of claim 1, wherein in the polymer
   R is selected from the group consisting of $-CH_3$, $-CH_2CH_3$, and $-CH(CH_3)_2$;

R' is the same or different from R and is selected from the group consisting of $-(CH_2)_nCH_3$, and $-CH_2C_6H_4(CH_2)_nY$, wherein Y is $O-(C_1-C_3)$alkyl alkyl, alkenyl or alkynyl, and n is greater than 1 and up to 50; and R'' is the same or different from R and R' and comprises $-CH_2CH_3$ or $-CH_2CH_2CH_3$.

5. The dye laser of claim 1, wherein
   the solvent comprises a liquid solvent.

6. The dye laser of claim 5, wherein
   the solvent is selected from the group consisting of xylene, methanol, chloroform, toluene, chlorobenzene, tetrahydrofuran, chlorobenzene, and dichlorobenzene.

7. The dye laser of claim 1, wherein
   the conductive polymer is present at a concentration of about 0.1 to 10 mg/ml.

8. The dye laser of claim 1, wherein
   the lifetime of luminescence of the dye laser solution is less than about 100 picoseconds.

9. A method of producing a coherent laser emission in the operation of a dye laser in the wavelength range of about 550 to 800 nm comprising placing in an optically resonant cavity and optically pumping a laser dye solution to produce a population inversion in the laser dye solution with resulting stimulated emission, a laser dye solution comprising:

a laser dye solution comprising a conductive polymer having the chemical formula:

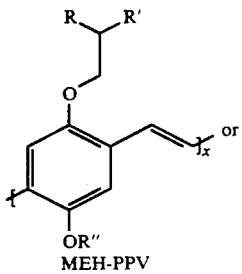

MEH-PPV

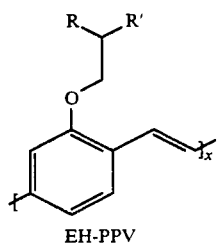

EH-PPV wherein

R comprises $(C_1-C_{10})$alkyl; R' is the same or different from R and comprises alkyl, substituted alkyl, benzyl, or substituted benzyl, the substituted compounds being selected from the group consisting of $-(CH_2)_3CH_3$ and $-CH_2C_6H_4(CH_2)_nY$, wherein Y is O-alkyl, alkyl, alkenyl or alkynyl and n is greater than 1 and up to 200; R" comprises $(C_1-C_{10})$alkyl; x is greater than about 20 and up to 200; and a non-aqueous solvent; the solvent being substantially unable to chemically react with the polymer and to absorb and emit light at a wavelength similar to those of the conductive polymer; and a pumping energy source producing stimulated emission in the dye solution.

10. A laser device, comprising a solid body of a conductive polymer having the chemical formula:

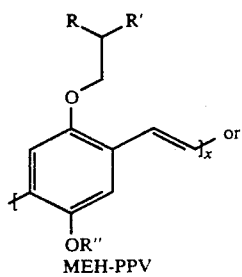

MEH-PPV

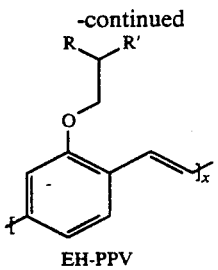

EH-PPV wherein R comprises $(C_1-C_{10})$alkyl, R' is the same or different from R and comprises alkyl, substituted alkyl, benzyl, or substituted benzyl the substituted compounds being selected from the group consisting of $-(CH_2)_nCH_3$ and $-CH_2C_6H_4(CH_2)_nY$, wherein R" is the same or different from R and R' and comprises $(C_1-C_{10})$ alkyl and x is greater than about 20; and a host polymer; the host polymer being unable to chemically react with the conductive polymer and unable to absorb and emit light at a wavelength similar to the conductive polymer;

means for pumping the solid body to generate light therein; and means for generating distributed feedback of the light to achieve a substantially coherent beam of light which is emitted from the solid body.

11. The laser device of claim 10, wherein the conductive polymer is present in the host polymer at a concentration of about $10^{-4}$ to $10^{-1}$M.

12. The laser device of claim 10, wherein the host polymer is selected from the group consisting of polymethylmethacrylate, polycarbonate, polyethylene, polyurethane, polystyrene, modified polymethylmethacrylate, epoxies, polyesters, tetramethoxysilane, methyl, methacrylate, ethylene glycol, 3-(trimethoxysilyl)propyl methacrylate and 3-glycidoxy propyl trimethoxysilane.

13. The laser device of claim 10, wherein the wavelength of the pumping energy source comprises about 400 to 900 nm.

14. The laser device of claim 10, wherein the wavelength of the stimulated emission is about 550 to 800 nm.

15. The laser device of claim 10, wherein the means for generating the distributed feedback comprises a grating.

16. The laser device of claim 15 further comprising a substrate having a surface; and wherein the grating is in the surface of the substrate; and the solid body is on the surface of the substrate and disposed over the grating.

17. The laser device of claim 16, wherein the body comprises a layer of the conductive polymer.

18. The laser device of claim 16, wherein the means for pumping the solid body comprises an optical pumping means.

19. The laser device of claim 10, wherein the means for pumping the solid body comprises a pair of contacts and means for applying a voltage across the body between the contacts.

20. The laser devices of claim 19, wherein the solid body has a pair of opposed surfaces and a separate contact is on each of the surfaces.

21. The laser device of claim 20, wherein the means for generating distributed feedback comprises one of the contacts being in the form of a plurality of strips spaced along the surface of the body with a periodicity matched to an emission wavelength of the body.

22. The laser device of claim 21, wherein
the means for generating distributed feedback comprises a pair of spaced mirrors, one of them in the form of a plurality of stripes.

23. The laser device of claim 21, wherein
the contacts also form the mirrors.

24. The laser device of claim 23, wherein
at least one of the contacts is at least partially transparent to allow light to pass therethrough.

25. A method of producing a coherent laser emission in the operation of a diode laser in the wavelength range of about 550 to 800 nm comprising placing in an optically resonant cavity and optically pumping a laser diode to produce a population inversion in the laser diode with resulting stimulated emission, the laser diode comprising the laser device of claim 10.

26. The laser device of claim 10 wherein the solid body comprises a mixture of the conductive polymer and the host polymer.

* * * * *